No. 890,299. PATENTED JUNE 9, 1908.
F. PORSCHE.
AUTOMATIC REGULATION FOR DYNAMO ELECTRIC MACHINES.
APPLICATION FILED APR. 4, 1903.
3 SHEETS—SHEET 1.
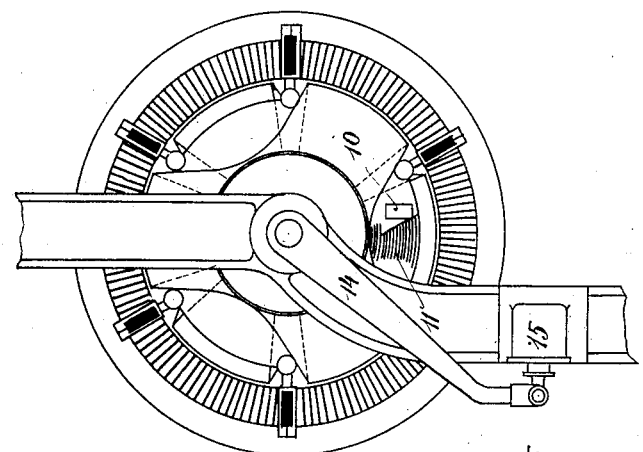
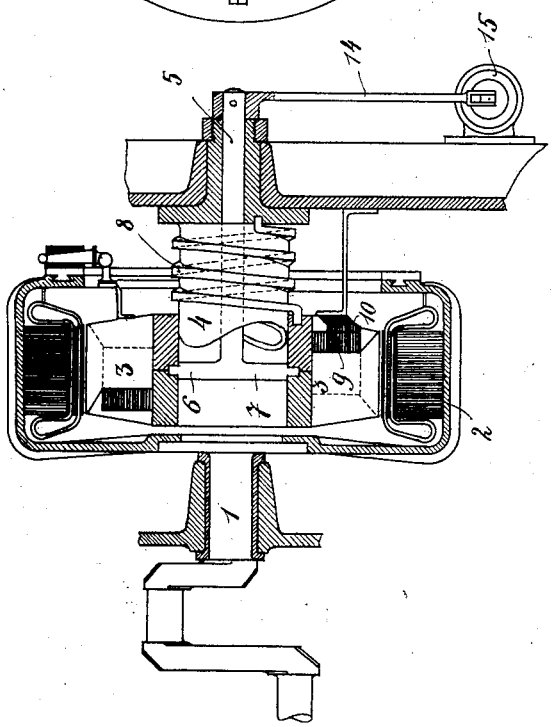

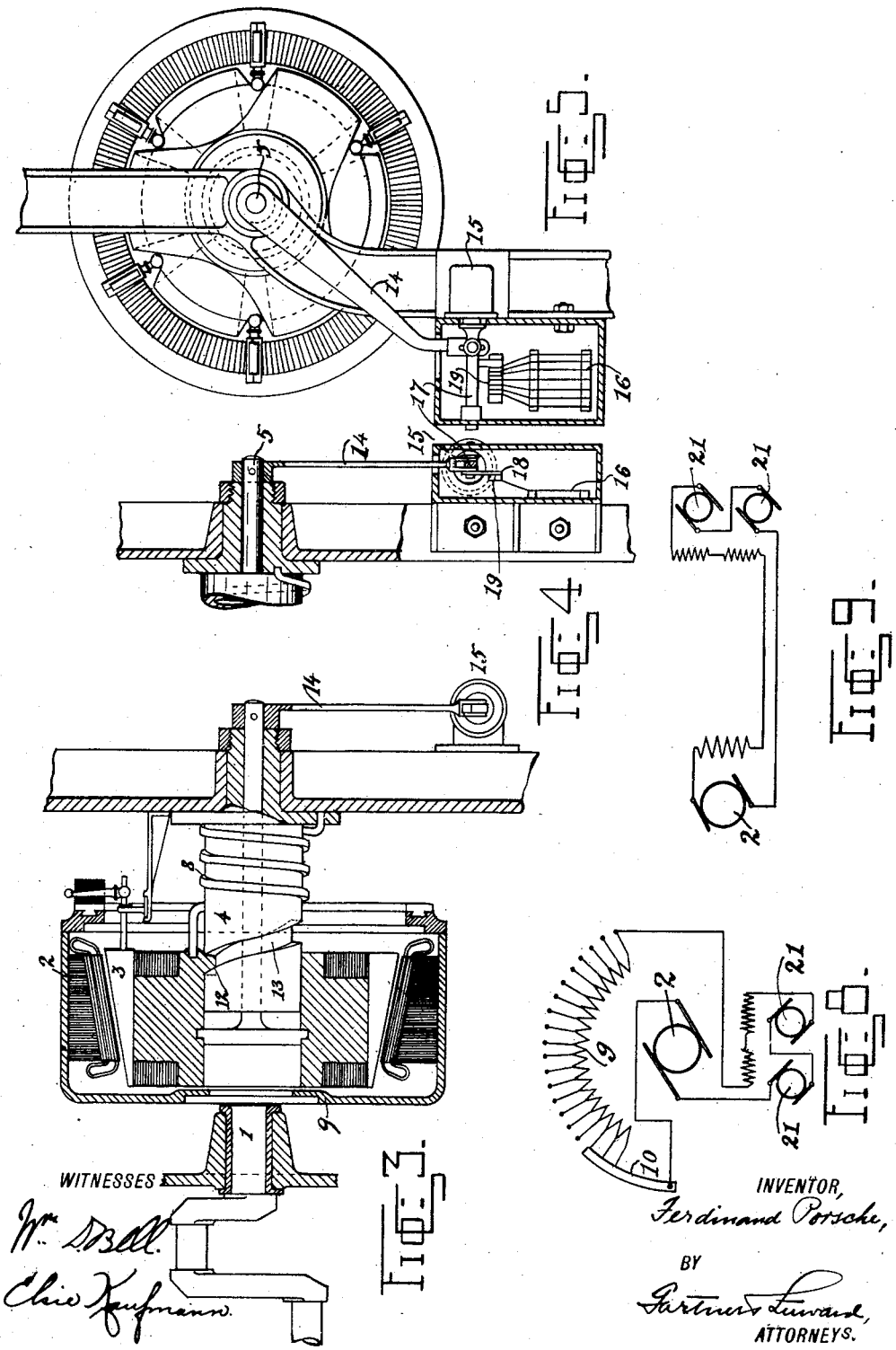

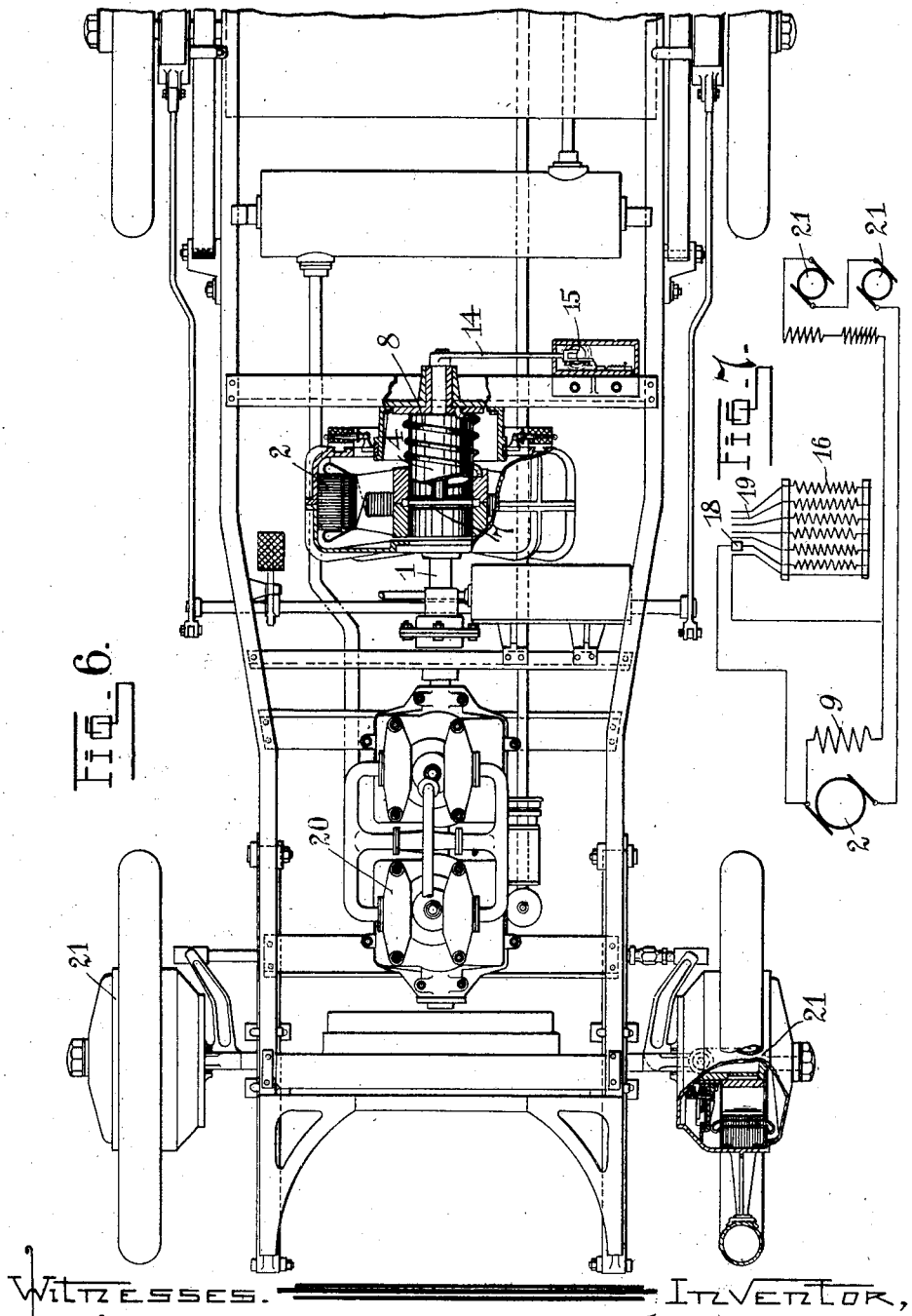

UNITED STATES PATENT OFFICE.

FERDINAND PORSCHE, OF VIENNA, AUSTRIA-HUNGARY.

AUTOMATIC REGULATION FOR DYNAMO-ELECTRIC MACHINES.

No. 890,299.        Specification of Letters Patent.        Patented June 9, 1908.

Application filed April 4, 1903. Serial No. 151,077.

*To all whom it may concern:*

Be it known that I, FERDINAND PORSCHE, civil engineer, subject of the Emperor of Austria-Hungary, residing in Vienna, Austria-Hungary, have invented Improvements in Automatic Regulations for Dynamo-Electric Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to dynamo electric machines, and particularly to the automatic regulation thereof, more particularly of those used on vehicles, such as for instance motor cars, for supplying current to the electric motor propelling the car, the dynamo being driven by any desired motor, such as for instance, an explosion engine.

The object of the device is to obtain a constant torque on the explosion engine, which is one of the requirements where economical running is concerned.

It is well known that explosion engines develop their maximum efficiency only at a certain given torque and at constant speed; with a greater or less torque, not only their efficiency becomes less but, if said effort exceeds the normal one by about 20%, the engine stops altogether. In using therefore explosion engines for driving motor cars it is necessary to alter the resistance of the car which changes all the time in accordance with the slope of the road in such manner that the engine should always work with the same circumferential effort and at the same speed.

The majority of existing motor-cars with explosion engines and mechanical transmission gear (toothed wheels, chains or belts), have for that purpose three or four different gears for transmitting power from the engine shaft to the axle.

In motor cars with explosion engines and electrical transmission, that is to say those in which the explosion engine is directly coupled to a dynamo and the electric power produced reconverted into mechanical energy by means of one or two electro motors which drive the wheels, the object mentioned is attained by varying the connections of the armature or of the field magnets of the dynamo and of one or both electro-motors and partly by switching in or out resistances.

In both systems mentioned it is possible to obtain from a constant supply of current a condition for good working of the explosion engine, only in a very approximate manner; for the regulation is not only limited by the considerations of space, weight and design, but it cannot be made automatic and depends on the ability of the driver to find the most suitable regulation.

As owing to the varying gradients of the roads the resistance of the car varies to an enormous extent, while in the existing designs only a small number of different speeds can be used, the explosion engine is constantly over or under-loaded and, therefore, it is impossible for it to work at maximum efficiency.

According to this invention, the current for the motor, which has to vary according to the gradient of the road, is supplied by a dynamo directly coupled to the explosion engine and automatically regulated in such manner that it always absorbs the same power whatever be the intensity of the current.

In order that the dynamo may always require the same driving power, whatever be the intensity of the current, whereby the product of the intensity of the current and the electro-motive force will always give the same number of watts, the field magnet is not fixed but is movable (preferably revolubly), so that upon turning the same the field force can be increased or decreased as hereinafter indicated. The field magnet, for this purpose, is influenced by two forces acting in opposite directions, the one being that exerted by the moving armature and the other exerted by some such means as a spring. This latter means must be of such strength that it permits a turning of the field magnet in the direction of the turning of the armature according to the strength of current in the coils of the armature as soon as the normal driving power of the motor is overstepped. The weakening of the field magnets, at this turning, can be accomplished in three ways. (A) Coils of field magnet winding may be switched in or out. (B) Air gap between the pole pieces and the armature may be increased or reduced in length. (C) Resistance may be switched in, in parallel to the field-magnet winding.

The automatic switching in or out of coils of the field magnet windings, is effected by providing the dynamo with a device illustrated in Figures 1 and 2 of the accompanying drawing, Fig. 3 showing how the air gap between the field magnets and the armature can be modified, Figs. 4 and 5 showing how the resistance may be varied. Fig. 6 showing an explosion engine, a dynamo, a motor, and connections between these parts; Fig. 7 being a diagrammatic view of the electrical connections for the apparatus shown in Fig. 6 involving that species of the invention wherein varying of the resistance is resorted to; Fig. 8 showing electrical connections for the arrangement shown in Figs. 1 and 2; and, Fig. 9 showing electrical connections for the arrangement shown in Fig. 3.

To the crank-shaft 1 of an explosion engine is secured the armature 2 of the dynamo, the field magnets of which are pivotally mounted on a hollow sleeve 4 secured to a bracket. Through the latter passes an arm 5, two lateral projections 6, 7 of which pass through slots in the sleeve 4 and are secured to the field magnets 3. The field magnet winding is preferably in series with the armature winding, but can be also formed as a compound winding or shunt.

To the other end of the arm 5 is secured a lever 14 connected to the piston of an oil dash pot 15 of some well known construction.

8 is a strong helical spring, one end of which is secured to the bracket and the other to the field magnets. The exciting winding 9 of the latter comprises a copper band, each single coil of which is insulated from the other and which projects out at the side. The current to it can be supplied by means of a brush 10 arranged above a sloping recess 11 of the copper band, said brush normally resting from the top with one edge against one coil of the copper band.

If the resistance to the electromotor increases owing to the road resistance increasing, the current passing through the electromotor also increases, according to the well known rule, and in this case also the intensity of the current of the dynamo. The result is that the armature of the dynamo, owing to the increased attraction between it and the field magnets, turns the latter on the hollow pin against the action of the spring 8. The spring 8 may be dispensed with, the armature adjusting itself according to the attractive forces present between the field magnet and the armature. In this way the brush 10 is brought against another coil of the field magnet winding, situated nearer the axis of the field magnets, that is to say, some of their coils are switched out. In this way the magnetic field is weakened, the electromotive force decreases, the current can increase until the original number of watts is again attained.

When the gradient of the road is again beginning to decrease, that is to say when the resistance of the car begins to decrease, the reverse takes place, the intensity of the current decreases, the field magnets are turned in the opposite direction, new windings thus being switched in until the product of the intensity of the current and the electromotive force gives again the original number of watts.

Owing to the number of watts always remaining constant, the explosion engine is all the time working with the same effort and therefore with the maximum efficiency.

In the example illustrated in Fig. 3, the pole-pieces, as well as the armature core, are arranged beveled relatively to each other, and the field magnets engage, by means of a pin 12, with a helical groove 13 on the hollow sleeve 4. When the strength of the current in the electromotor and the dynamo increases or decreases, the field magnets, as already stated, are turned and thus moved to the right or to the left, as the pin 12 has to follow the groove 13 when the field magnets are turned. In this way the air-gap between the field magnets and the armature is increased or reduced in length and the inductive action correspondingly changed, the effort of the explosion engine remaining constant.

Instead of shifting the field magnets as described with reference to Figs. 1 and 2, for the purpose of switching in or out coils of the winding, this shifting may be utilized for switching in resistances parallel to the field magnet winding. An illustration is shown in Figs. 4, 5 and 6. The switching of the resistance 16 is accomplished by a lever-arm 14 engaging the piston bar of the oil dash-pot 15. This piston bar is lengthened upward by a guide-bar 17 which has a sliding contact 18. The latter slides upon the points 19 which are connected with the resistance coils 16 in the usual manner. When the lever 14 turns, the piston of the oil dash-pot is moved, the necessary resistance being either switched in or out.

In Fig. 6, 20 is an explosion engine having its shaft directly connected with the shaft 1 of the armature 2 of the dynamo; 21 designates the electric motors, mounted on the front wheels of a vehicle 22.

Fig. 7 illustrates the electrical connections between the dynamo and motor for an apparatus like that shown in Fig. 6 in the case where the object aimed at is accomplished by automatically varying the resistance.

Claims.

1. In combination with a motor car, an explosion engine, a dynamo comprising a rotary armature secured to the crank shaft of the explosion engine, a field magnet normally held stationary but movable upon variations of attractive powers acting between said magnet and the armature, the said magnet pivotally mounted on a hollow sleeve secured to an immovable bracket, an arm passing through the said sleeve, means to secure one end of the said arm to the magnet, means to steady the movements of the other end of said arm, and means controlled by the magnet, for causing a decrease of the magnetic flux with an increasing car resistance and for causing an increase of the magnetic flux with a decreasing car resistance, whereby to keep constant the output of the dynamo while altering the voltage and the current intensity, substantially as described.

2. In combination with a motor car, an explosion engine, a dynamo comprising a rotary armature secured to the crank-shaft of the explosion engine, a field magnet normally held stationary but movable upon variations of attractive powers acting between said magnet and the armature, the said magnet pivotally mounted on a hollow sleeve secured to an immovable bracket, an arm passing through the said sleeve, means to secure one end of the said arm to the magnet, means controlled by the other end of the said arm, for causing a decrease of the magnetic flux with an increasing car resistance and for causing an increase of the magnetic flux with a decreasing car resistance, whereby to keep constant the speed and output of explosion engine and dynamo while altering the voltage and the current intensity, substantially as described.

In testimony, that I claim the foregoing, I have hereunto set my hand this twentieth day of March, 1903.

FERDINAND PORSCHE.

Witnesses:
 FRANZ REITER,
 ALVESTO S. HOGUE.